Feb. 28, 1967 W. G. FLANNELLY 3,306,399
VIBRATION ABSORBER

Filed Nov. 18, 1964 3 Sheets-Sheet 1

INVENTOR.
WILLIAM G. FLANNELLY

BY McCormick, Paulding & Huber
ATTORNEYS

Feb. 28, 1967 W. G. FLANNELLY 3,306,399
VIBRATION ABSORBER
Filed Nov. 18, 1964 3 Sheets-Sheet 2

INVENTOR.
WILLIAM G. FLANNELLY
BY *McCormick, Paulding & Huber*
ATTORNEYS

INVENTOR.
WILLIAM G. FLANNELLY
BY
McCormick, Paulding & Huber
ATTORNEYS

United States Patent Office 3,306,399
Patented Feb. 28, 1967

3,306,399
VIBRATION ABSORBER
William G. Flannelly, South Windsor, Conn., assignor to Kaman Aircraft Corporation, Bloomfield, Conn., a corporation of Connecticut
Filed Nov. 18, 1964, Ser. No. 412,163
11 Claims. (Cl. 188—1)

This invention relates to a vibration absorber, and deals more particularly with such a device which utilizes a moving mass or masses to generate forces which counteract the exciting forces and thereby reduce or eliminate the total or resultant exciting forces exerted on the body in question.

The general object of this invention is to provide a vibration absorber having improved characteristics as compared to other presently available absorbers.

A more particular object of the invention is to provide a vibration absorber wherein a relatively small mass of the absorber is capable of absorbing or counteracting vibrating forces produced by a very much more massive body, thereby permitting the absorber to be made as a relatively lightweight device in comparison to the body or structure with which it is associated.

Another object of the invention is to provide a vibration absorber which is capable of absorbing vibrations or vibrating forces of various different amplitudes.

A still further object of the invention is to provide a vibration isolator which will absorb vibrations occurring in any direction in a given plane.

Another important object of the invention is to provide a vibration absorber having a frequency response characteristic such that at least one exciting frequency an antiresonant condition is achieved whereat one hundred percent (100%) absorption is, or is at least very nearly produced. In keeping with this object, another object of the invention is to provide a vibration absorber having two such antiresonant frequencies.

Another object of the invention is to provide a vibration absorber of the type mentioned in the preceding paragraph which is readily synchronized with the exciting frequency to produce maximum effectiveness, particularly in cases where the exciting vibration is the result of rotating machinery.

Other objects and advantages of the invention will be apparent from the following description and from the drawings forming a part hereof.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Figure 1:
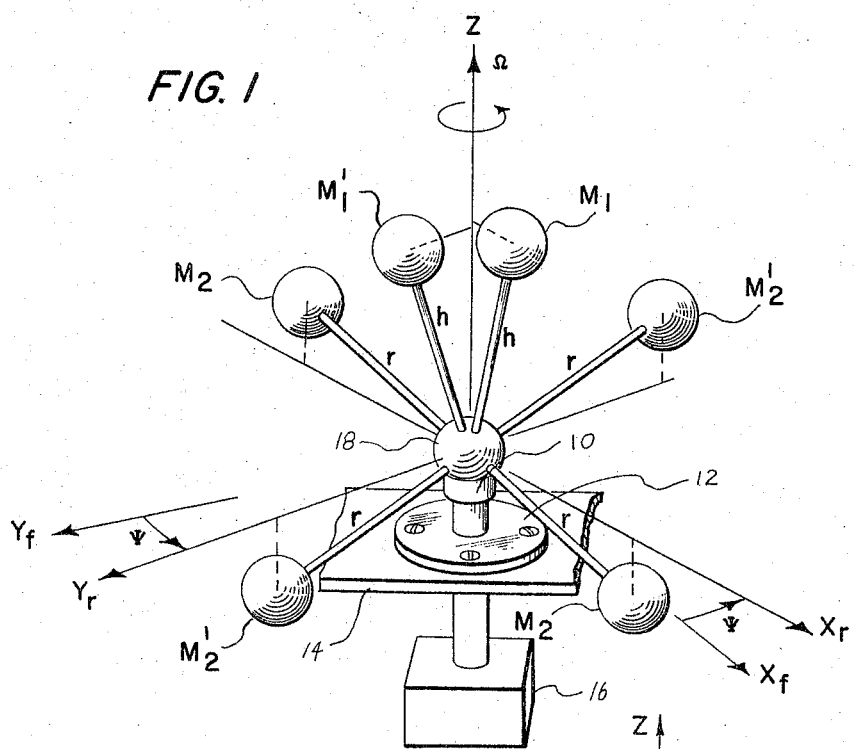
FIG. 1 is a schematic perspective view of a vibration absorber embodying the present invention.

Turning now to the drawings and first considering FIG. 1, this figure shows schematically a vibration absorber embodying the present invention. The absorber comprises two mass systems each connected with a driving part or hub 10 for rotation with the hub 10 about a common drive axis, represented by the axis Z in FIG. 1. A suitable bearing 12 rotatably supports the hub 10 relative to the structure 14, and a motor or other drive means 16 is drivingly connected with the hub 10 for producing rotation of the latter. The structure 14 is the vibrating structure.

Each of the two mass systems of the absorber is pivotally connected to the hub 10 for rotation about another axis normal to the rotational axis of the hub, the two pivot axes in turn being perpendicular to one another. In FIG. 1, each mass system is shown to comprise three concentrated masses. The first mass system comprises the masses $M_2$, $M_2$ and $M_1$, and is pivotally connected to the hub 10 for rotation about the Y axis. The second mass system comprises the masses $M'_2$, $M'_2$ and $M'_1$, and is pivotally connected with the hub 10 for rotation about the X axis. In FIG. 1, the pivotal connection between the hub and the two mass systems is for simplicity not shown in detail and is indicated generally by the reference 18.

Figure 2:
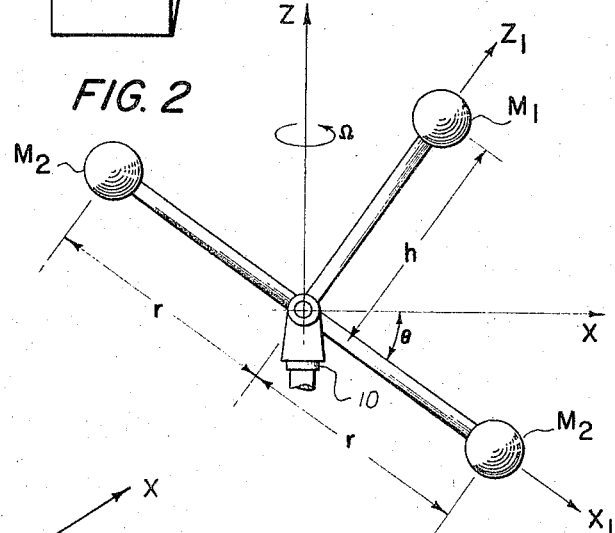
FIG. 2 is a side elevational view of one of the mass systems of FIG. 1.

The two mass systems, except for being pivotal relative to the hub about different axes, are substantially identical with one another. FIG. 2 shows the first mass system by itself, and referring to this figure, it will be noted that the two masses $M_2$, $M_2$ are located on opposite sides of the pivot axis of the system relative to the hub and are carried by arms which space each mass a distance $r$ from the pivot axis. The mass $M_1$ is carried by another arm which is perpendicular to the two arms of the masses $M_2$, $M_2$ and which spaces the center of the mass $M_1$ a distance $h$ from the pivot axis of the system relative to the hub. From this, it will be noted that the mass system is symmetrical about an axis of symmetry perpendicular to its pivot axis and coincident with the arm for the mass $M_1$. Also, the system has substantial moments of inertia about its pivot axis, its axis of symmetry and another axis perpendicular to both the pivot axis and the axis of symmetry.

Each of the two mass systems of FIG. 1 may be referred to as a "tripole" because of the three concentrated masses included in the system and their right angular relationship to each other. This tripolar arrangement of the mass system is not, however, necessary to the invention and has been shown in FIGS. 1 and 2 to simplify the understanding of the operation of the absorber and its mathematical analysis. Considering such analysis of the operation of the tripolar absorber, and referring to FIG. 3, this figure shows a top view of the axes for the absorber. More particularly, the $X_F$ and the $Y_F$ axes are fixed relative to the vibrating structure 14 and $X_R$ and the $Y_R$ axes are fixed relative to the hub 10 and rotate with the hub relative to the fixed structure 14.

The equations of motion of one mass system or rigid body are, for small angles $\theta$, $$I_{y_1}\ddot{\theta} + (I_{z_1} - I_{x_1})\Omega^2\theta + S_1\ddot{\delta}_x \cos \Omega t = 0 \quad \text{(Eq. 1)}$$

$$S_1\ddot{\theta} \cos \Omega t - 2S_1\Omega\dot{\theta} \sin \Omega t - S_1\Omega^2\theta \cos \Omega t + m\ddot{\delta}_x = f_x \quad \text{(Eq. 2)}$$

where $S_1$ is the static moment about the pivot axis, $m$ is the mass of the pivoted body and $f_x$ is the vibrating excitation force.

Multiplying Eq. 1 by $\sin (\Omega t + \varphi_1)$ and again by $\cos (\Omega t + \varphi_1)$, for $n$ rigid bodies pivoting individually each about an axis at angle $\varphi_i$ from the $Y_r$ axis, and summing for $n$ rigid bodies gives the equations of motion:

$$I_{y_1}\sum_{i=1}^{n}\ddot{\theta}\sin(\Omega t+\varphi_i)+(I_{z_1}-I_{x_1})\Omega^2\sum_{i=1}^{n}\theta\sin(\Omega t+\varphi_i)$$

$$+S_1\ddot{\delta}_x\sum_{i=1}^{n}\cos(\Omega t+\varphi_i)\sin(\Omega t+\varphi_i)=0 \quad \text{(Eq. 3)}$$

$$I_{y_1}\sum_{i=1}^{n}\ddot{\theta}\cos(\Omega t+\varphi_i)+(I_{z_1}-I_{x_1})\Omega^2\sum_{i=1}^{n}\theta\cos(\Omega t+\varphi_i)$$

$$+S_1\ddot{\delta}_x\sum_{i=1}^{n}\cos^2(\Omega t+\varphi_i)=0 \quad \text{(Eq. 4)}$$

$$S_1\sum_{i=1}^{n}\ddot{\theta}\cos(\Omega t+\varphi_i)-2S_1\Omega\sum_{i=1}^{n}\dot{\theta}\sin(\Omega t+\varphi_i)$$

$$-S_1\Omega^2\sum_{i=1}^{n}\theta\cos(\Omega t+\varphi_i)+M\ddot{\delta}_x=f_x \quad \text{(Eq. 5)}$$

where $M=nm$.

Defining the distance along the $Y_f$ axis from the axis of rotation to the center of gravity of all $n$ pivoted bodies or mass systems as $$\frac{S_1\xi_1}{M}$$

and the distance along the $X_f$ axis from the axis of rotation to the center of gravity of all $n$ pivoted elements as $$\frac{S_1\xi_2}{M}$$

it follows that $$\xi_1=\sum_{i=1}^{n}\theta\sin(\Omega t+\varphi_i) \quad \text{(Eq. 6)}$$

and $$\xi_2=\sum_{i=1}^{n}\theta\cos(\Omega t+\varphi_i) \quad \text{(Eq. 7)}$$

Therefore, $$\dot{\xi}_1=\sum_{i=1}^{n}\dot{\theta}\sin(\Omega t+\varphi_i)+\Omega\sum_{i=1}^{n}\theta\cos(\Omega t+\varphi_i) \quad \text{(Eq. 8)}$$

and $$\dot{\xi}_2=\sum_{i=1}^{n}\dot{\theta}\cos(\Omega t+\varphi i)-\Omega\sum_{i=1}^{n}\theta\sin(\Omega t+\varphi_i) \quad \text{(Eq. 9)}$$

Substituting Equations 6 through 9 into Equations 3 through 5, summing for $n=2$ and $\varphi_1=0$, $\varphi_2=\pi/2$, and assuming a solution of $\xi_1=\Xi_1 e^{i\omega t}$ etc., gives $$\begin{bmatrix} 0 & -\omega^2 I_{x_1}+\Omega^2(I_{z_1}-I_{x_1}-I_{y_1}) & -2i\omega\Omega I_{y_1} \\ -S_1\omega^2 & 2i\omega\Omega I_{y_1} & -\omega^2 I_{y_1}+\Omega^2(I_{z_1}-I_{y_1}-I_{x_1}) \\ -M\omega^2 & 0 & -S_1\omega^2 \end{bmatrix} \begin{bmatrix} \Delta_x \\ \Xi_1 \\ \Xi_2 \end{bmatrix} = \begin{bmatrix} 0 \\ 0 \\ F \end{bmatrix} \quad \text{(Eq.10)}$$

from which it follows that $\Delta_x=0$ when $$\omega=\omega_A=\pm\Omega\left[1\pm\sqrt{\frac{I_{z_1}-I_{x_1}}{I_{y_1}}}\right] \quad \text{(Eq. 11)}$$

Figure 3:
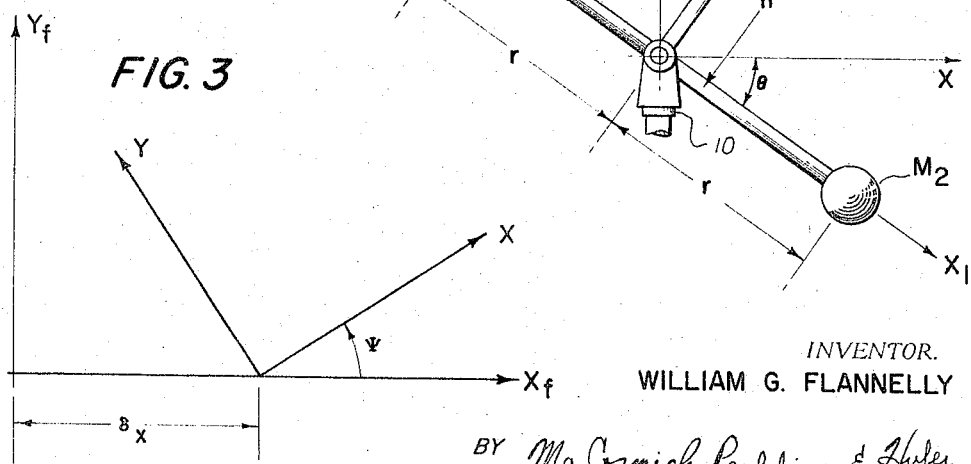
FIG. 3 is a top view of the coordinate systems of FIG. 1.
Figure 4:
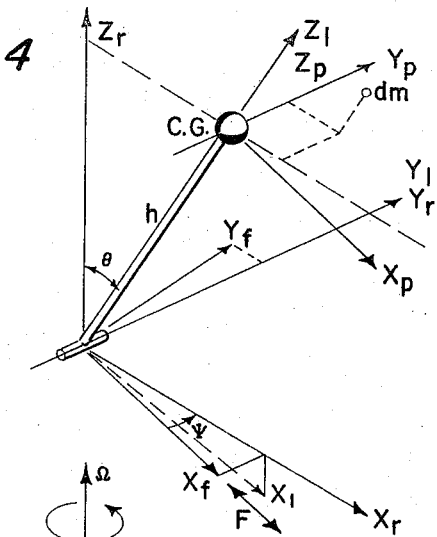
FIG. 4 is a figure illustrating coordinate systems and the like for a general analysis of an absorber embodying the present invention.

The above analysis in addition to applying to the simplified two mass system absorber of FIGS. 1, 2 and 3, may also be taken as a more generalized analysis based on FIG. 4. In accordance with the more generalized analysis, an absorber having any number of mass systems $n$ may be assumed and each mass system may be of any given shape. Starting with a mass particle $dm$ in each mass system and integrating over the entire body of the system, the end result is the same equation as Equation 11 given above. In this equation, it should be noted that the axes $X_1$, $Y_1$ and $Z_1$ are fixed to the body or mass system in question and have their origin at the intersection of the pivot axis and the axis of rotation. The axis $Y_1$ coincides with the pivot axis, the axis $X_1$ is normal to the pivot axis, and the axis $Z_1$ is an axis of symmetry which is normal to both the pivot axis and the $X_1$ axis. The relationship of these axes to other axes will be apparent from FIG. 4 which shows one rigid body of an absorber constrained to pivot about the $Y_r$ axis.

From inspecting equation 11, it will be noted that there are two antiresonant frequencies and that each antiresonant frequency is directly proportional to the angular velocity of the absorber. The absorber may, therefore, be readily tuned to the exciting frequency by properly selecting the angular velocity. In cases where the exciting frequency is related to the angular speed of a rotating shaft or other rotating part, this tuning is easily accomplished by controlling the speed of the absorber in response to the speed of the rotating part. This may be done in many different ways, as for example, drivingly connecting the absorber to the rotating part or by driving the absorber by a synchronous motor the speed of which is controlled by the speed of the rotating part.

Also from equation 11, it will be observed that in order for the absorber to operate $I_{z_1}$ must be equal to or greater than $I_{x_1}$. Since $Z_1$ is the axis of symmetry and $X_1$ the axis perpendicular to both the pivot axis and the axis of symmetry this means that each mass system or rigid body must have its mass so distributed as to have a moment of inertia about its axis of symmetry which is equal to or greater than its moment of inertia about an axis perpendicular to both its pivot axis and axis of symmetry. Further, it will be understood that since the absorber includes at least two mass systems symmetrically disposed about the axis of rotation, it will be effective to absorb vibrations occurring in any direction lying in a plane perpendicular to the rotational axis.

Figure 5:
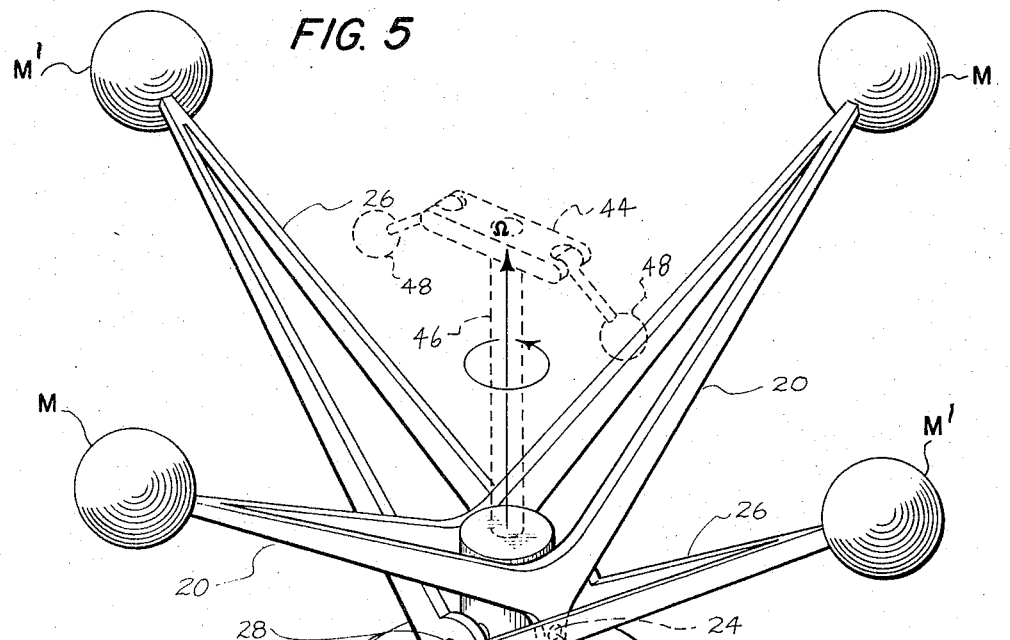
FIG. 5 is a perspective view showing another embodiment of the present invention.

From the foregoing analysis, it will be noted that the shape of each mass system of an absorber embodying the present invention may vary widely as may the means for rotating the mass systems and for confining their movement to movement about axes perpendicular to the driving axis. FIG. 5, for example, shows another embodiment of the invention wherein the first mass system constitutes two concentrated masses M, M carried respectively at the free ends of two arms 20, 20. At their inner ends, each of the two arms 20, 20 are divided so as to straddle the driving part or hub 22. The two arms 20, 20 are integral with one another and are arranged at an angle to one another. At their apex they are pivotally connected to the driving part 22 by a pivot pin 24 to permit rotation of the mass system relative to the driving part 22 about the illustrated $X_r$ axis. The second mass system is generally similar to the first mass system and includes two arms 26, 26 which carry concentrated masses M', M' at their outer ends. The two arms 26, 26 are integral with one another at their inner ends and straddle the driving part 22 to which they are pivotally connected by a pivot pin 28 for rotation about the illustrated $Y_r$ axis. In order that the $X_r$ and $Y_r$ axes may intersect, the arms 20, 20 of the first mass system include, on either side of the driving part 22, a portion 30 which is located between the divided portions of the associated arm 26 of the second mass system and which receive the associated hinge pin 24.

The driving part 22 is rotatably supported by a suitable bearing 32 fixed to the vibrating structure 34. In the illustrated case, the vibrating structure 34 is shown to be excited by a device 36 connected with the supporting structure 34 and driven by a rotating shaft 38 so that the frequency of the exciting vibration is related to the speed of the shaft 38. The shaft 38 is in turn driven by a motor or other suitable power source indicated generally at 40. Since the exciting vibrations imposed on the structure 34 are related to the speed of the rotating shaft 38, the absorber may be readily tuned to the exciting frequency by rotating the driven part 22 at a speed related to that of the shaft 38. In the illustrated case, this is accomplished by suitable gearing, indicated generally at 42, which drivingly connects the shaft 38 with the driven part 22. As a result of this driving connection, the absorber is automatically and continuously tuned to the exciting frequency despite changes in such frequency.

Before leaving the absorber of FIG. 5, it should be further noted that, as previously explained, the absorber is capable of counteracting or absorbing vibrations occurring in any direction in the plane normal to the drive axis and defined by the $X_f$ and $Y_f$ axes. If it is desired to absorb vibrations in three dimensions, the absorber may be readily converted into a three dimensional absorber by adding thereto an additional absorber or device capable of counteracting or absorbing vibrations occurring parallel to the drive axis. One suitable form of such an additional absorber is shown by the broken lines of FIG. 5 and is referred to as a centrifugal pendulum absorber. Basically, this additional absorber comprises a transversely elongated hub or carrier 44 drivingly connected with the driving part or hub 22 by a shaft 46 so that the carrier is driven in unison with the part 22. Pivotally connected to each end of the carrier 44 is a pendulous mass 48, the pivot axes for the masses 48, 48 being located in a plane normal to the axis of the shaft 46 and perpendicular to a radial line passing through such axis. A centrifugal pendulum absorber such as shown by the broken lines in FIG. 5 is more fully described and explained in an article appearing on pages 190 to 194 of the June 1949 issue of the Journal of Applied Mechanics and entitled, "The Use of the Centrifugal Pendulum Absorber for the Reduction of Linear Vibration." Reference may be made to this article for a more complete understanding of the centrifugal pendulum absorber.

Figure 6:
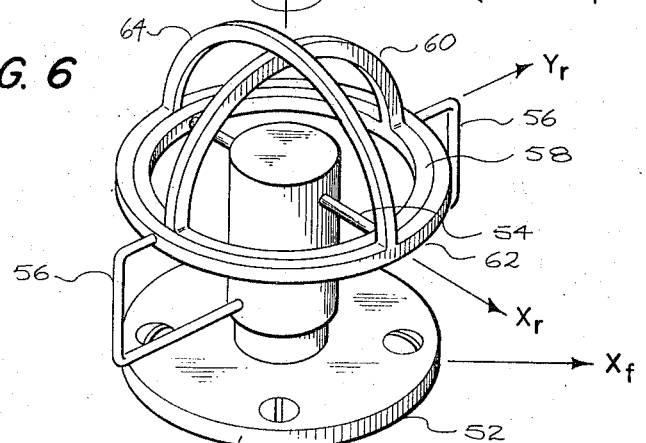
FIG. 6 is a perspective view showing another embodiment of the present invention.
Figure 7:
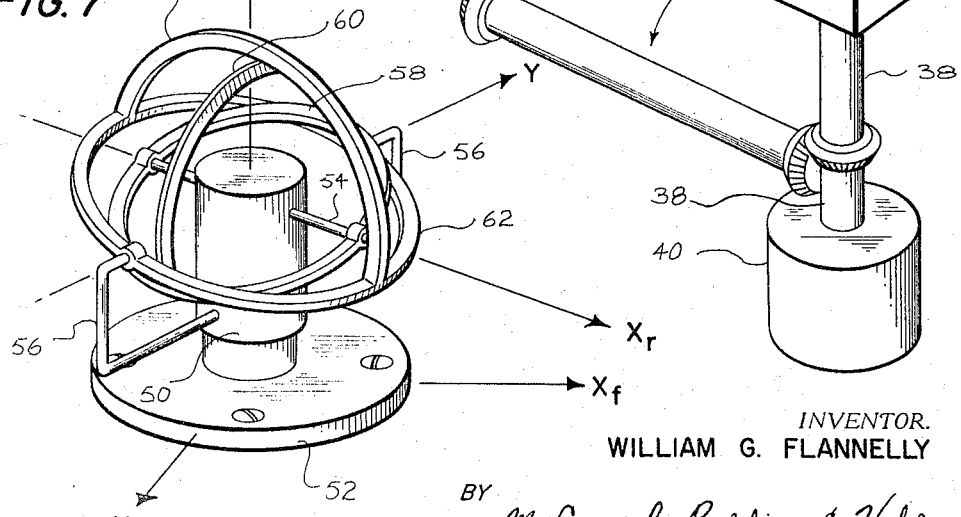
FIG. 7 is a perspective view of the absorber of FIG. 6 and showing the parts of the absorber in positions different from those occupied in FIG. 6.

Another embodiment of the invention is shown in FIGS. 6 and 7. In this absorber, the mass of each mass system is, at least in part, distributed or arranged in annular rings rather than being concentrated. Referring to FIGS. 6 and 7, the driven part of the absorber is indicated at 50 and is rotatably supported relative to the vibrating structure by a suitable bearing 52. The $X_f$ and the $Y_f$ axes represent the plane of the exciting vibrations. The absorber includes two mass systems, one of which is pivotally connected to the driven part 50 for rotation about the $X_r$ axis by a pivot pin 54 and the other of which is pivotally connected to the driven part by carriers 56, 56. Each carrier 56 is so shaped as to have an inner end connected to the driving part at a location spaced from the point of intersection of the $X_r$ and the $Y_r$ axes so as to permit free rotation of the mass systems about their pivot axes without interfering with the carriers.

The first mass system of the FIG. 6 and 7 absorber includes an annular ring 58 which is pivotally connected to the pivot pin 54 at two diametrically opposed points. Integral with the ring 58 is another semi-circular ring 60 which extends upwardly from the ring 58 and which is arranged generally perpendicular to the pivot pin 54. The second mass system includes a circular ring 62 which surrounds the ring 58 of the first mass system, and it further includes a semi-circular ring 64 which is integral therewith and which extends upwardly therefrom above the semi-circular ring 60 of the first mass system perpendicular to the pivot axis $Y_r$ provided by the two carriers 56, 56. The two carriers 56, 56 for the second mass system are fixed to the driven part 50 and are pivotally connected to the ring 62. FIG. 6 shows the two mass systems in a neutral condition whereat the two rings 58 and 62 are coplanar, and FIG. 7 shows the same absorber with both mass systems tilted about their pivot axes away from their normal positions.

Figure 8:
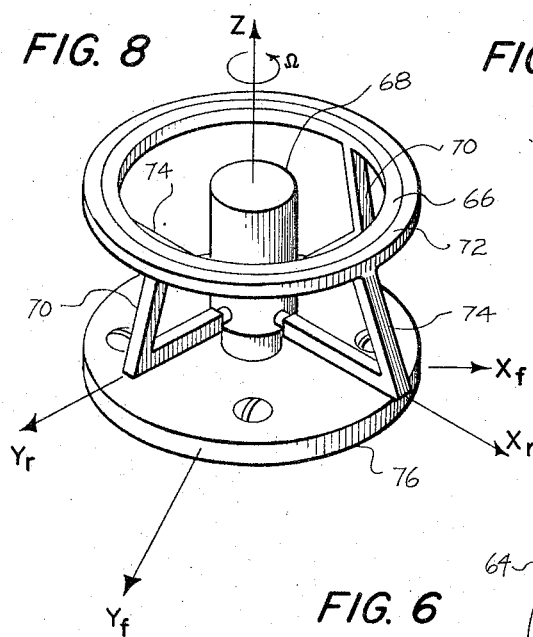
FIG. 8 is a perspective view of another embodiment of the present invention.

FIG. 8 shows another embodiment of the invention which also, similar to the embodiment of FIGS. 6 and 7, includes two mass systems wherein the mass of each system is distributed, at least in part, in an annular ring. Referring to FIG. 8, one mass system consists of a ring 66 which is pivotally supported relative to the hub 68 by two generally L-shaped arms 70, 70 which are integral with the ring 66 and which are pivotally connected with the hub 68 for rotation about the illustrated $Y_r$ axis. Similarly, the second mass includes a ring 72 which in the normal condition of the absorber illustrated in FIG. 8, surrounds the ring 66. The ring 72 is in turn pivotally connected with the hub or driving part 68 by two integral arms 74, 74 generally similar to the arms 70, 70 of the first mass system. The two arms 74, 74 are pivotally connected with the hub 68 so as to be rotatable about the illustrated $X_r$ axis which is perpendicular to and intersects the $Y_r$ axis. From FIG. 8 it will be understood that dimensions of the rings 66 and 72 and of the arms 70, 70, 74 and 74 are such as to permit the desired pivoting of the mass systems about the $Y_r$ and $X_r$ axes without interference. Also, the rings 66 and 72 are spaced from the plane of the pivot axes and therefore by themselves produce the required moments. The driving part 68 similar to the driving parts of the foregoing absorbers is rotatably supported by a bearing 76 fixed to the vibrating structure.

Figure 9:
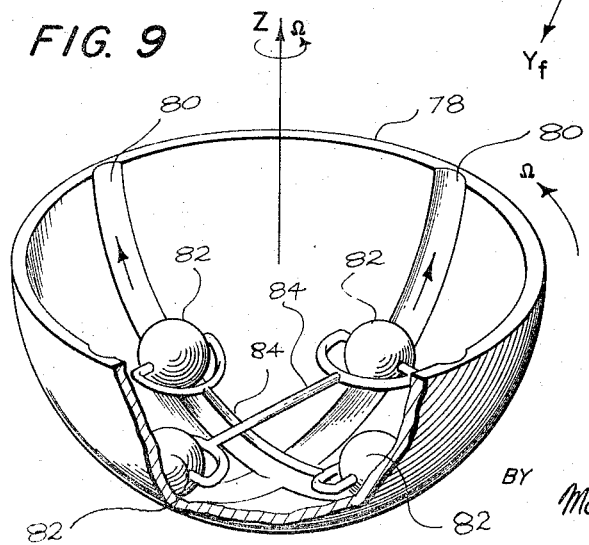
FIG. 9 is a perspective view of still another embodiment of the invention.

FIG. 9 illustrates still another embodiment of the invention wherein the mass systems are constrained to movement about intersecting axes perpendicular to the drive axes by means other than a pivotal connection with the driving part. In this embodiment, the driving part comprises a bowl-shaped or spherical part 78 which is suitably supported for and driven in rotation about its axis of symmetry indicated at Z. Formed on the inner surface of the part 178 are two arcuate guide grooves 80, 80 having a common center of curvature located on the Z axis. Each groove 80 accommodates an associated mass system comprising two balls 82, 82 which are such a size as to roll freely in the groove and as to be restrained by the groove against movement relative to the bowl member 78 about the Z axis. Each of the two balls 82, 82 of each mass system is joined to the associated ball by a connecting link 84 which is pivotally connected with the balls so as to allow the same to roll along the associated groove 80 and to maintain the two balls a fixed distance apart from one another. As the part 78 rotates about the Z axis, and as vibrations are imposed on associated supporting structure in a plane perpendicular to the Z axis, the balls 82, 82 oscillate in the grooves 80, 80 in a manner similar to the oscillations of the pivoted masses of the foregoing absorbers and produce the same vibration absorbing results.

The invention claimed is:

1. In a vibration absorber for use in reducing vibrations of a body occurring in a given plane, the combination comprising a first mass system having its mass arranged generally symmetrically about a first axis of symmetry, means for supporting said first mass system for rotation about a first axis fixed relative to said body perpendicular to said given plane and also for rotation about a second axis normal to said first axis and fixed relative to said first mass system, said first mass system having a moment of inertia about said first axis of symmetry which is equal to or greater than its moment of inertia about an axis normal to said first axis of symmetry and said second axis, a second mass system having its mass arranged generally symmetrically about a second axis of symmetry, means for supporting said second mass system for rotation about said first axis and also for rotation about a third axis normal to both said first and second axes and fixed relative to said second mass system, said second mass system having a moment of inertia about said axis of symmetry which is equal to or greater than its moment of inertia about an axis normal to said second axis of symmetry and said third axis, and means for rotating said two mass systems in unison about said first axis.

2. The combination defined in claim 1 further characterized by said two axes of symmetry and said first, second and third axes intersecting at a common point.

3. The combination defined in claim 1 further characterized by means rotatable about said first axis in unison with said two mass systems for absorbing vibrations occurring in a direction parallel to said first axis.

4. In a vibration absorber for use in reducing vibrations of a body occurring in a given plane, the combination comprising a driving part rotatable about a first axis fixed relative to said body perpendicular to said given plane, a first mass system pivotally connected with said driving part for rotation relative to said driving part about a second axis generally normal to said first axis, and a second mass system pivotally connected with said driving part for rotation relative to said driving part about a third axis normal to both said first and second axes, said first mass system having an axis of symmetry perpendicular to said second axis and having its mass so distributed as to have a moment of inertia about an axis perpendicular to both said second axis and said axis of symmetry which is equal to or smaller than the moment of inertia about its said axis of symmetry, said second mass system having an axis of symmetry perpendicular to said third axis and having its mass so distributed as to have a moment of inertia about an axis perpendicular to both said third axis and said axis of symmetry which is equal to or smaller than the moment of inertia about its said axis of symmetry.

5. The combination defined in claim 4 further characterized by said second axis and said third axis intersecting one another at a point on said first axis.

6. The combination defined in claim 4 further characterized by means connected with said driving part for rotation in unison therewith for absorbing vibrations occurring in a direction parallel to said first axis.

7. The combination defined in claim 4 further characterized by each of said two mass systems comprising a plurality of arms fixed relative to one another and extending outwardly from the associated pivot axis, each of said arms having a concentrated mass at one point thereon.

8. The combination defined in claim 4 further characterized by each of said two mass systems including an annular mass surrounding said first axis.

9. In a vibration absorber for use in reducing vibrations of a body occurring in a given plane, the combination comprising a plurality of mass systems supported for rotation about a first axis fixed relative to said body perpendicular to said given plane and also for rotation about individual axes symmetrically disposed about and normal to said first axis and each fixed relative to its associated mass system, and means for rotating said plurality of mass systems in unison about said first axis, each of said mass systems having an axis of symmetry perpendicular to its associated individual axis and having its mass so distributed as to have a moment of inertia about an axis perpendicular to both said axis of symmetry and said individual axis which is equal to or smaller than the moment of inertia about said axis of symmetry.

10. The combination defined in claim 9 further characterized by said individual axes of said mass systems intersecting at a common point on said first axis.

11. In a vibration absorber for use in reducing vibrations of a body occurring in a given plane, the combination comprising a first mass system, means for supporting said first mass system for rotation about a first axis fixed relative to said body perpendicular to said given plane and also for rotation about a second axis normal to said first axis and fixed relative to said first mass system, a second mass system, means for supporting said second mass system for rotation about said first axis and also for rotation about a third axis normal to both said first and second axes and fixed relative to said second mass system, and means for rotating said two mass systems in unison about said first axis, said means for supporting said first mass system, said means for supporting said second mass system, and said means for rotating said two mass systems in unison comprising a means supported for rotation about said first axis and providing two arcuate guide means, said two arcuate guide means being perpendicular to one another and having a common center of curvature located on said first axis, and each of said two mass systems comprising at least one mass constrained to move along a respective one of said arcuate guide means.

References Cited by the Examiner

UNITED STATES PATENTS

| 2,514,290 | 7/1950 | Panofsky | 188—1 X |
| 2,599,539 | 6/1952 | Boyd et al. | 188—1 X |

FOREIGN PATENTS 400,957  11/1933  Great Britain.

DUANE A. REGER, *Primary Examiner.*